United States Patent Office 3,565,783
Patented Feb. 23, 1971

3,565,783
FLEXIBLE INTERCELL CONNECTOR FOR ELECTROLYTIC CELLS
Alvin T. Emery, North Tonawanda, and John E. Currey, Lewiston, N.Y., assignors to Hooker Chemical Corporation, Niagara Falls, N.Y., a corporation of New York
Continuation of application Ser. No. 565,820, July 18, 1966. This application July 7, 1969, Ser. No. 845,638
Int. Cl. B01k 1/00
U.S. Cl. 204—267                                                4 Claims

ABSTRACT OF THE DISCLOSURE

A flexible electrical intercell connector is described comprising an angled busbar having a plurality of conductive sheets positioned in a spaced-relationship to the major surfaces of each other, said sheets being joined at opposite ends thereof to provide attachment means and said busbar including a change of direction of about 30 to about 150 degrees between said attachment means.

---

This application is a continuation of our co-pending application Ser. No. 565,820, filed July 18, 1966, and now abandoned.

This invention relates to flexible intercell busbar connectors for electrolytic cells and more particularly to flexible, highly conductive, metal busbar connectors used to convey electrolytic current from one electrolytic cell, particularly chlor-alkali diaphragm cells, to another electrolytic cell.

Electrolytic cells, such as chlor-alkali diaphragm cells are commonly utilized in commercial production facilities as a multitude of individual cells. These cells are electrically connected to each other in groups of 2 to about 100 or more cells. Most commonly, the cells are located in a bank or row of 10 to 50 cells depending on the particular cell room design. It is most economical and advantageous to connect these cells through a common source of electric current by attaching the cathode of one cell to the anode of the adjoining cell through an intercell busbar connector, thereby passing the electric current from one cell to another through the entire bank of cells. While this method is highly advantageous in many respects, difficulties are encountered due to the thermal expansion of the various parts in the electrolytic cell as the cell is placed into operation. Normal operating temperatures of the electrolyte are about 92 to 105 degrees centigrade and certain of the metal parts, particularly the busbars, may be heated to substantially higher temperatures. Thus, depending upon the size of the particular electrolytic cell, the thermal expansion can amount to about 1/32 to 1/4 of an inch or more, per cell, which expansion, because of the rigidity of previous intercell connectors, has a cumulative effect across the entire bank of cells.

Previously, intercell busbar connectors were of heavy copper about one inch thick and four to eight inches wide. One to 10, and most commonly 4 to 6 of these connectors are used for each cell. Several thousand pounds of force were required to flex each connector. Thus, a substantially rigid intercell connection resulted. As a result, the substantial force exerted tended to push the cathode section of the cell out of alignment with the anode section. With increasing sizes and capacities of electrolytic cells, the requirement for the heavy intercell connector increases to maintain the lowest practical current resistance, while the criticality of electrode alignment within the cell also increases. Due to the extreme forces exerted by the thermal expansion upon the electrodes of the cells, misalignment and ultimate shorting of the electrodes occurs, reducing the current efficiency of the cell due to such misalignment. Such a loss in efficiency cannot be competitively tolerated in the economical use of high capacity electrolytic cells.

It is an object of the present invention to provide an electrical intercell connector of low current resistance and of substantially increased flexibility. Another object of this invention is to provide an electrical intercell connector of low surface area and of high flexibility while retaining the desirable features of previous intercell electrical connectors. These and other objects will become apparent to those skilled in the art from the description of the invention which follows.

In accordance with the invention, an electrical intercell connector is provided, comprising a busbar having a plurality of conductive sheets having their major surfaces positioned in a spaced relationship to one another, said sheets being joined at opposite ends thereof to provide an attachment means and said busbar, including a change of direction at an angle of about 30 to 150 degrees between said attachment means.

The present invention provides a flexible intercell connector which flexes at only a fraction of the force required for solid connectors of the same weight and volume of metal, while providing comparable low electrical resistance. The force required to deflect the present connectors is reduced by a factor of 5 to 10 or more, compared to prior connectors. A further marked advantage of the present connectors is the minimizing of the surface area exposed to the atmosphere, compared to other methods of providing flexibility, and thus minimizing corrosion, which can be a substantial problem in the corrosive atmosphere associated with many electrolytic cells. Another particularly desirable advantage of the present apparatuses is the cooling effect obtained by the novel structure. In cell operations, the connectors can heat to relatively high temperatures and as a result, cooling is often desirable.

The invention will be further described by reference to the drawings in which.

Figure 1:
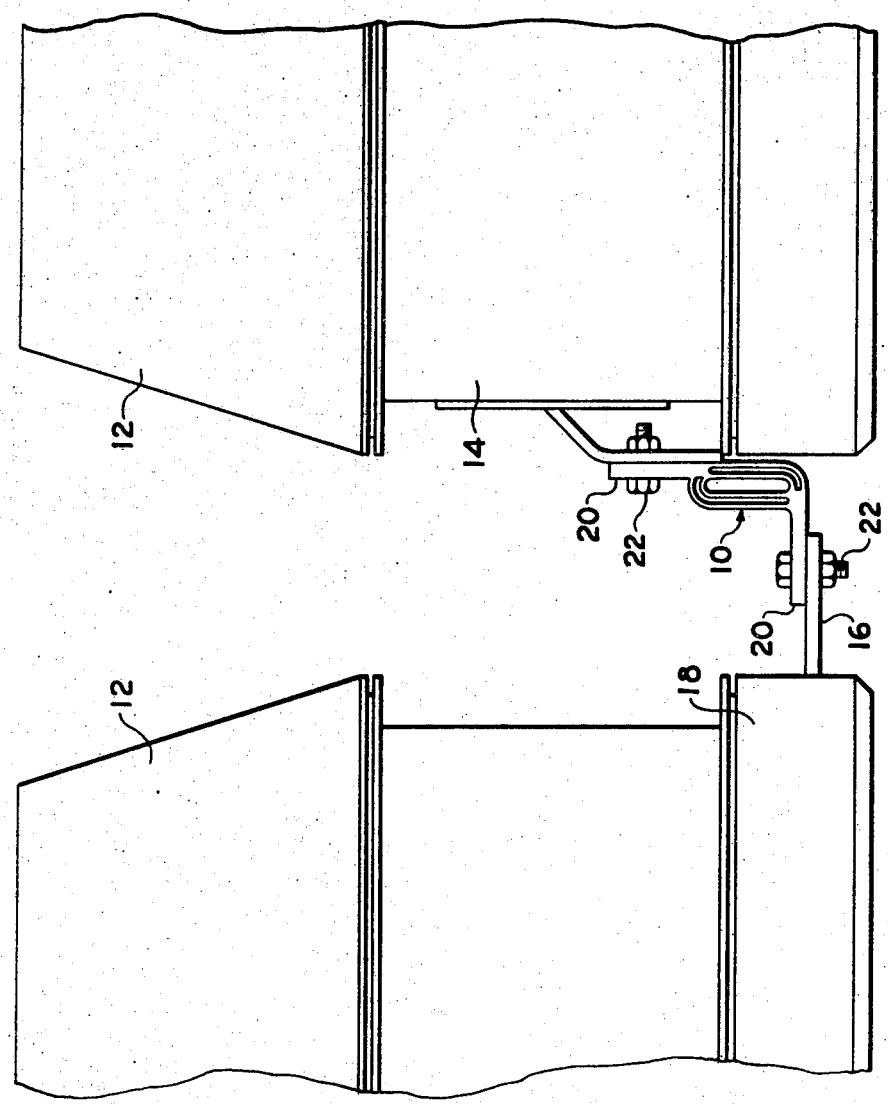
FIG. 1 is a front elevation of two partially illustrated electrolytic cells, showing the intercell busbar connector positioned between the two cells.

Although the present invention is useful as an electrical connector between many different types of electrolytic cells, the most preferred use is with chlor-alkali diaphragm cells. Therefore, the invention will be further described with particular reference to chlor-alkali diaphragm cells. However, such a description is not to be considered as limiting the particular use of such cell connectors.

Intercell connector 10 is positioned between the electrolytic cells 12, with one end attached to the cathode section 14 of one electrolytic cell 12, and the other end attached to busbar extension 16 imbedded in the cell bottom 18 of an adjoining electrolytic cell 12. Intercell connector 10 has attachment means 20, which can be merely an extension of the intercell connector in a length desired to make contact with the cathode section 14 of one cell and the busbar extension 16 of the other cell. Clamping devices, bolts 22, or other attaching means can be provided to securely fasten the intercell connector to the electrolytic cell. When bolts 22, or similar devices are used, holes 21 are commonly provided in the attachment means 20 of the intercell connector 10 to more securely hold the connector in place.

Intercell connector 10 is preferably constructed of a highly conductive metal such as copper, silver or alloys thereof, but can also be of less conductive metals such as aluminum, steel, nickel and alloys thereof, and the like. However, because of the desirability of obtaining a low resistance connector at reasonable cost, copper is usually the most preferred material.

Although intercell connector 10 is preferably L-shaped (bent at 90 degrees) to provide flexibility, it can also include a change in direction or be angled within the range of about 30 to 150 degrees between opposite ends, that is, between opposite attachment means 20. Thus, although the preferred embodiment is of an angle of about 90 degrees, other bends or angles including a plurality of angles such as a corrugated structure, can be utilized within the given range with correspondingly good results.

Numerous designs of connector 10 can be utilized. All of these designs have a plurality of metallic sheet memebrs 24 positioned in a spaced relationship to each other. The drawings illustrate some of the more preferred embodiments.

Figure 3:
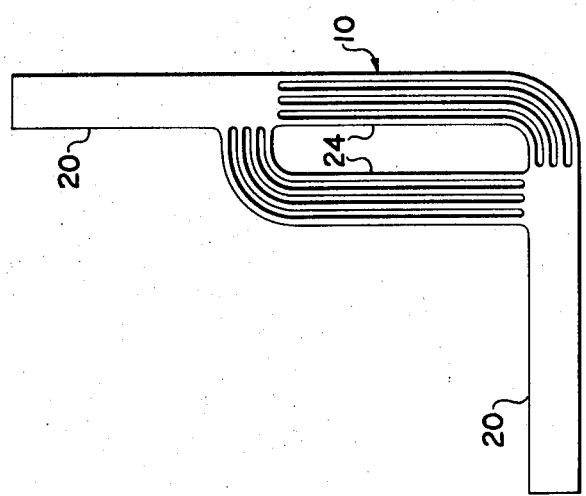
FIG. 3 is a front elevation of another embodiment of a flexible intercell connector constructed in accordance with the present invention.
Figure 2:
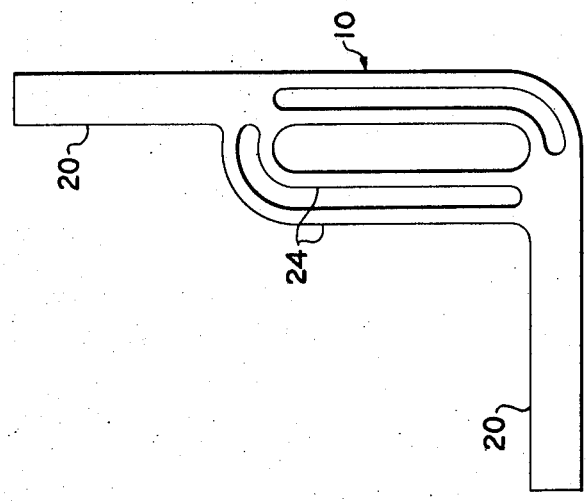
FIG. 2 is a front elevation of a flexible intercell connector constructed in accordance with the present invention.

FIGS. 2 and 3 illustrate a particularly preferred embodiment having a bifurcated structure of a plurality of sheet members 24 conjoined to the attachment means 20. This particular structure unexpectedly reduces the flexing force required, as will be seen in the examples, over that of the unidirectional structure of FIG. 4.

Sheet members 24 can be of various thicknesses and widths according to the particular demands of the particular electrolytic cell. The total number of sheets, times the thickness thereof can be of equal cross-sectional area to the metal attachment means 20 or of a greater or lesser area as is desired for the particular electrolytic cell. Preferably, the total cross-sectional area or thickness of the plurality of sheet members 24 is about equal to that of attachment means 20. In general, depending upon the particular electrical current requirement, flexibility desired, design requirement and the like, the sheet members can be of a thickness of about $\frac{1}{32}$ of an inch up to about $\frac{1}{2}$ inch, and, more preferably, are in the range of about $\frac{1}{16}$ of an inch to about $\frac{5}{16}$ of an inch thick. Thus, for a connector having a total thickness of about one inch, the number of sheet members 24 can vary from about 2 to 32 or more. Most preferably, the number of sheet members is about 3 to 20.

The distance between the sheet members 24 is that distance required to preferably avoid contacting the adjoining sheet members 24 in flexing connector 10 through the expected flex distance or angle. Thus, the spaced distance may be as little as $\frac{1}{64}$ of an inch, but is more preferably at least $\frac{1}{32}$ of an inch, up to about one inch or more depending again upon the particular size of the connector, the design and electrical requirement and the like. In a preferred embodiment, an intercell connector having a copper requirement of about one inch thickness and six inches in width is made in accordance with the present invention by utilizing eight, sheet members of $\frac{1}{8}$ inch thickness by 6 inches wide, positioned $\frac{1}{8}$ of an inch apart to thereby provide a total copper requirement equal to a 1 inch thick by 6 inches wide structure.

Figure 4:
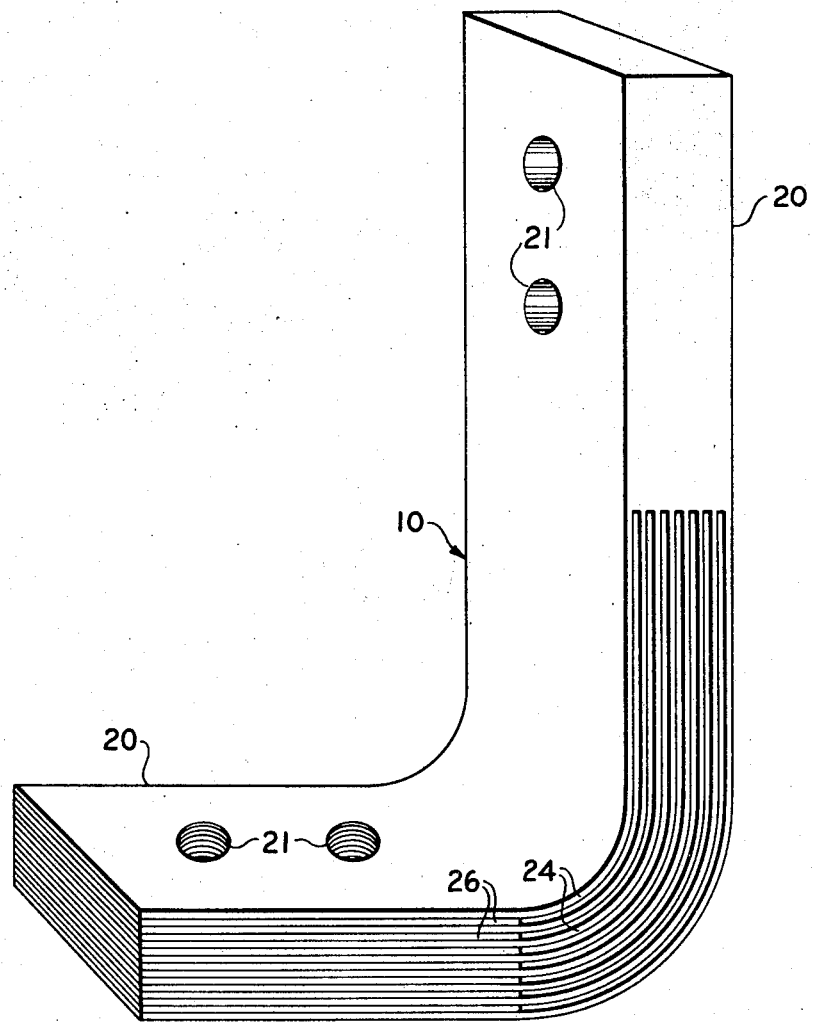
FIG. 4 is a perspective view of a further embodiment of a flexible intercell connector constructed in accordance with the present invention, further illustrating a laminated attachment means on one end and a solid attachment means on the other end.

The sheet members are preferably positioned parallel to each other with the plane surfaces of one sheet positioned in a spaced relationship to another sheet. The desired number of sheets is attached to attachment means 20 by welding, clamping, bolting or the like. In one embodiment, as is illustrated in FIG. 4, attachment means 20 can be comprised of spacers 26 placed alternately between sheet members 24, thereby providing the desired spaced relationship between the sheet members. Alternately, attachment means 20 can be a solid bar of metal.

The following examples illustrate certain preferred embodiments of the present invention.

EXAMPLES 1 THROUGH 4

Intercell connectors were constructed and tested in accordance with the designs illustrated in FIGS. 2, 3 and 4 and the forces required to flex the structures varying distances, as would be encountered in normal cell operations when attached as in FIG. 1, were determined.

Example 1 illustrates a standard solid copper connector of one inch thickness and six inches in width.

Example 2 represents an intercell connector constructed in accordance with FIG. 2 utilizing four ¼ inch thick sheets of copper of six inches in width, thereby providing a total amount of copper equal to that of Example 1.

Example 3 represents an intercell connector constructed in accordance with FIG. 3 utilizing eight sheets of copper ⅛ inch thick and six inches wide, each group of four sheets being spaced ⅛ inch apart to provide a total amount of copper equal to that of Example 1.

Example 4 represents an intercell connector constructed in accordance with FIG. 4 having eight sheets of copper ⅛ inch thick and six inches wide spaced ⅛ inch apart to provide a copper equivalent in the flexing area equal to that of Example 1.

Table I gives the results obtained in flexing the various designs over the indicated distances. The distance is that length of movement incurred in compressing the intercell connector ends together in parallel lines of direction. The force required is measured in pounds.

TABLE I.—FORCE REQUIRED

| Amount of flexure, inches | Example | | | |
|---|---|---|---|---|
| | 1 | 2 | 3 | 4 |
| .0625 | 2,746 | 784 | 353 | 941 |
| .1250 | 4,708 | 1,569 | 510 | 981 |
| .1875 | 5,886 | 1,962 | 588 | 1,020 |
| .2500 | 6,180 | 2,158 | 588 | 1,081 |
| .3125 | 7,357 | 2,158 | 588 | 1,081 |
| .3750 | 7,848 | 2,158 | 588 | 1,081 |
| .4375 | 8,044 | 2,158 | 588 | 1,081 |
| .5000 | 8,240 | 2,158 | 588 | 1,081 |

In a like manner, other metals, such as silver, steel, aluminum, alloys thereof and the like metals can be used in the present intercell connector structure with correspondingly good results. It is noted that a substantial reduction in the force required for flexure of the intercell connectors occurs in apparatuses of the present invention. Such reduced forces are well within the tolerance ranges of electrolytic cells and thereby subsbtantially reduce or eliminate misalignment of the electrodes due to the forces of thermal expansions and other cell movements during cell operation.

While there have been described various embodiments of the present invention, the apparatus described is not intended to be understood as limiting the scope of the invention. It is realized that changes therein are possible. It is further intended that each element recited in any of the following claims is to be understood as referring to all equivalent elements for accomplishing substantially the same results in substantially the same or equivalent manner. It is intended to cover the invention broadly in whatever form the principles thereof may be utilized.

What is claimed is:

1. In an electrically connected chlor-alkali cell series comprising a plurality of adjacent series connected cells having cell bottom anode connection means and side mounted cathode connection means disposed so as to place said anode connection means and said cathode connection means in adjacent complemetary closely spaced relationship, the improvement comprising an external anode connector imbedded in a cell bottom extending in the general direction of said cathode connection means of said adjacent cell, a cathode connector extending from said side-mounted cathode connecting means in the general direction of said anode connector, and a conductive structurally unitary unarticulated flexible connector connecting said anode connector to said cathode connector and means to securely attach said intercell connector to said cathode and anode connections, said intercell connector having an intermediate flexure structure comprising plural spaced flexible conductive sheets ending in consolidated relatively inflexible conductive terminal attachment structures of unitary cross section and said cathode and said anode connections being disposed to provide points of attachment for said flexible intercell connector offset between 30 to 150 degrees from the plane of said anode connection.

2. The apparatus of claim 1 wherein the intermediate flexure structure comprises 2 to about 32 spaced metallic sheets of about 1/32 to 1/2 inch in thickness.

3. The apparatus of claim 2 wherein each of said metallic sheets are spaced about 1/64 of an inch to 1 inch apart.

4. The apparatus of claim 2 wherein said intermediate flexure structure comprises symmetrically bifurcated groups of metallic sheets diverging and converging to define an interior flexure space.

References Cited

UNITED STATES PATENTS

| | | | |
|---|---|---|---|
| 582,923 | 5/1897 | Hunt | 204—244 |
| 1,097,826 | 5/1914 | Townsend et al. | 204—266 |
| 2,998,374 | 8/1961 | Granfors | 204—279 |
| 3,052,619 | 9/1962 | Schmitt | 204—243 |
| 3,081,254 | 8/1963 | Morgan | 204—244 |

DONALD L. WALTON, Primary Examiner

U.S. Cl. X.R.

204—244, 253